P. J. ROONEY.
ROTARY RECIPROCATING DOUBLE ACTING PUMP.
APPLICATION FILED JAN. 29, 1920.
1,362,144.
Patented Dec. 14, 1920.
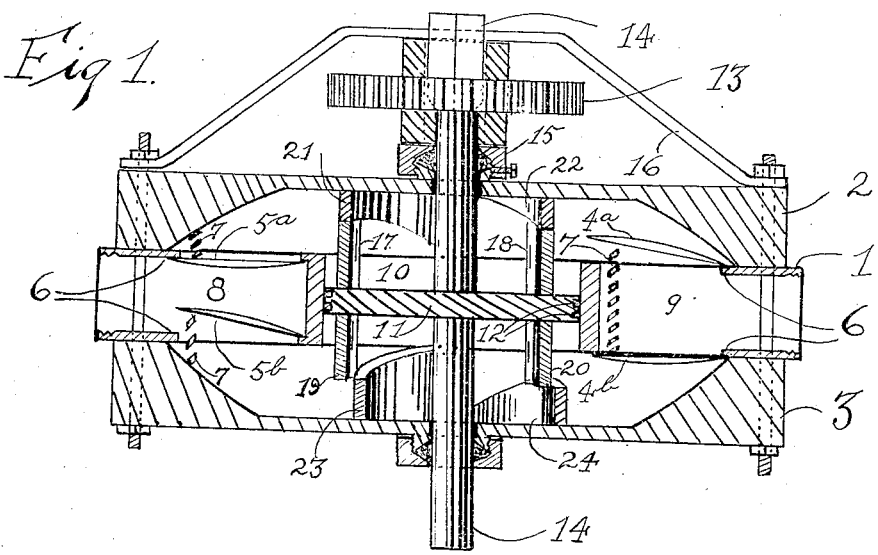
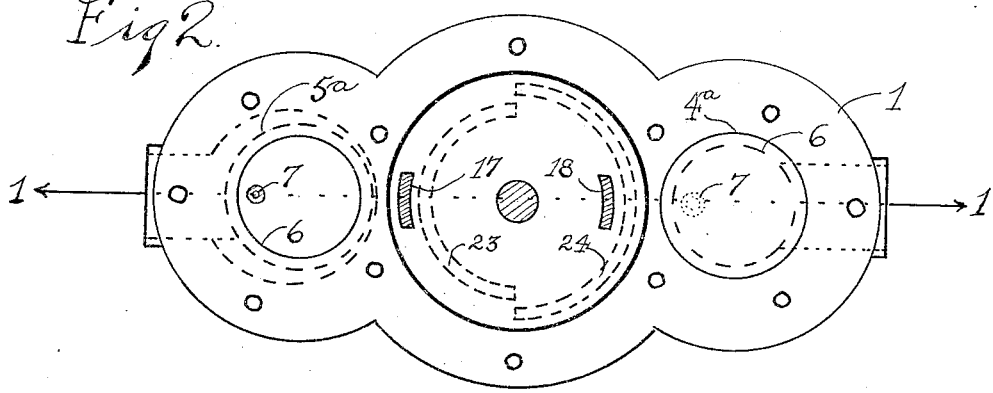
Patrick J. Rooney
INVENTOR.

UNITED STATES PATENT OFFICE.

PATRICK J. ROONEY, OF NEW ROCHELLE, NEW YORK.

ROTARY RECIPROCATING DOUBLE-ACTING PUMP.

1,362,144. Specification of Letters Patent. Patented Dec. 14, 1920.

Application filed January 29, 1920. Serial No. 354,839.

*To all whom it may concern:*

Be it known that I, PATRICK J. ROONEY, a citizen of the United States, residing at No. 106 Clove road, city of New Rochelle, county of Westchester, and State of New York, have invented a new and useful Rotary Reciprocating Double-Acting Pump.

My invention relates to reciprocating pumps and has for its objects first, to provide a new and useful method of converting rotary into reciprocating motion in a pump, second, to provide a pump in which the form of the castings of which it is composed does the work heretofore accomplished by a large number of moving parts, third, to provide a system of helical cam surfaces hereinafter referred to as helices and helical surfaces on the opposite sides of a rotary piston, which, by the engagement in sliding contact of studs projecting therefrom with the said helices, is reciprocated, fourth, to provide a valve system in this type of pump adapted to minimize the shock due to a change of direction of the flow of water and which at the same time is inexpensive to construct and easy to install, to inspect and to regulate, fifth, to provide a means for rotating the pump shaft and at the same time permitting it to reciprocate longitudinally through the driving gear, sixth, to provide a simple, compact and inexpensive system of bearings for the driving gear, seventh, to provide a pump of this type requiring very little machine work and composed mainly of simple and easily made castings and eighth, to allow for taking up on account of wear.

I attain these objects by the mechanisms illustrated in the accompanying drawings, which show a preferred embodiment of my invention, and in which Figure 1, is a vertical longitudinal section of the whole pump and driving gear, taken on a line marked 1.—1. in Fig. 2. and Fig. 2. is a top or plan of the pump with the cover removed.

Similar numerals refer to similar parts throughout the several views.

A pump casing 1 with a top cover 2 and a bottom cover 3 and with inlet valves 4ª and 4ᵇ and outlet valves 5ª and 5ᵇ located on valve seats 6 and held normally against the same by tension springs 7, with the outlet valves located in an outlet chamber 8 and with inlet valves located over an inlet chamber 9, contains a bored cylinder 10 in which a close-fitting piston 11 provided with piston rings 12 is free to rotate and also to reciprocate. A toothed wheel gear 13 with a squared bore hub contains the squared end of a driving shaft 14 in longitudinally slidable engagement therewith. This gear is supported by the shaft and bears against a combined stuffing box and bearing 15 on one side and against a metal strap 16 which is bolted to the pump and contains a hole to permit the passage of the shaft therethrough and is enlarged at its center around the said hole to form a bearing for the gear hub, on the other side of the said gear. Studs 17—18—19 and 20 are attached to the piston and are adapted to bear against helical surfaces 21—22—23 and 24, which project inwardly from the pump covers on opposite sides of the piston, during one-half a revolution of the piston and not to bear against the same helices during the other half revolution of the piston. The stud 17 is in contact with the helical surface 21, as illustrated, during one half of the revolution of the piston and during the other half revolution it rotates outside of the helical surface 22. The stud 18 is in contact with the helical surface 22, as illustrated, during one half revolution and rotates inside of the helical surface 21 during the other half revolution. Thus both of these studs on the upper face of the piston are in slidable engagement with their respective helices during one half revolution and revolve freely in space during the other half revolution. Each of these helical surfaces 21 and 22 have a slope which begins at the inner surface of the cover 2 and runs to a height corresponding to the amplitude of reciprocation of the piston and the studs are also of the same height. The slope of each of these helices 21 and 22 begins at diametrically opposite points and each such helix extends halfway around the cover and ends near where the other begins. These helices are of a different radius and also of a different degree of slope; the helix of smaller radius having a correspondingly greater degree of slope in order to reach the same height as the other helix in a shorter distance. The helices 23 and 24 are of identically similar construction and size except that they are positioned on the opposite cover and engage with the studs 19 and 20 on the opposite side of the piston from the studs 17 and 18, and are also opposite to the helices 21 and 22 in that the helices of similar diameter on the opposite sides of the piston form continuations of the circle of the other. Thus helix 21 is of the same radius as helix 24 and begins opposite a point where helix 24 ends and ends at a point exactly opposite that where helix 24 begins. So that if a line parallel to the axis of rotation were drawn through both of them and rotated about the axis it would describe a complete circle. And the helices 22 and 23 are positioned in relation to each other in the same manner. The studs 19 and 20 therefore engage with the helices 23 and 24 when the studs 17 and 18 are disengaged from the helices 21 and 22 and are disengaged when the others are engaged. The studs are set at different distances from the axis of the pump and the helices as aforesaid are set concentric with the circles described by the studs during the rotation of the piston and the helices are of a different radius corresponding to the distance of their respective coöperating studs from the axis of the pump.

The operation is as follows: When the shaft is rotated, referring to the illustration, in a clockwise direction the studs 17 and 18 engage in sliding contact with helices 21 and 22 and continue in such sliding engagement during one-half revolution in which time and as a result of which engagement the piston is reciprocated fully in one direction at the same time that it is being rotated. As the rotation continues, these studs and helices are disengaged and these studs revolve in space at the same time that the studs 19 and 20 engage in sliding contact with the helices 23 and 24 by which engagement the piston is reciprocated fully in the opposite direction and then the studs 17 and 18 again come into engagement with their coöperating helices while the studs 19 and 20 revolve in space. Thus the piston by its rotation is caused to reciprocate first in one direction and then in the other. At the same time the shaft moves up and down through its bearings and through the hub of the gear. The valve action is similar to that of other double-acting reciprocating pumps.

Various modifications may be made in my invention and I do not confine myself to the particular embodiment illustrated.

The studs or helices or both may be provided with strips of bearing metal or may be provided with wheel, ball or roller bearings as desired.

Means for lubricating the piston, rings, studs, helices and other bearing parts may be provided where the speed of rotation is to be high.

Wear may be taken up by planing down the pump cover surfaces thereby bringing the studs and helices in closer relation or the pump may be originally put together with metal gaskets the thickness of which may later be reduced to compensate for wear.

Instead of a gear driving mechanism as shown, belted pulleys or other driving mechanisms including direct drive may be used.

I claim:

1. A rotary reciprocating pump comprising a suitable pump casing with inlet and outlet valves, ports and connections, a bored pump cylinder adapted to contain a piston free to rotate and to be reciprocated therein, two sets of cams and studs each set comprising a plurality of inclined helical cams all set at different radial distances from a pump shaft and an equal number of studs set at correspondingly different distances from a pump shaft, said cams and studs co-acting together by being affixed to opposing surfaces of piston and pump casing to reciprocate the piston fully in one direction by the rotation thereof during one-half of a revolution and with a similar set of a plurality of cams and studs on the other opposing surfaces of the pump and piston co-acting to reciprocate the piston fully in the opposite direction during the other one-half revolution thereof and means for rotating the piston, substantially as described.

2. In a rotary reciprocating pump, the combination of two sets of cams and studs each set comprising a plurality of inclined cams set at different radial distances from the axis of rotation of a rotary piston and an equal number of studs set at correspondingly different distances from the said axis of rotation and coöperating by being affixed to opposite surfaces of piston and pump casing to reciprocate the piston fully in one direction by the rotation thereof during half a revolution, and fully in the opposite direction during the other half revolution, and a suitable pump casing for the same with inlet and outlet ports, valves and connections, a piston with shaft therefor, a pump cylinder for the said piston and means for rotating the pump shaft, substantially as described.

3. In a pump of the character described a plurality of concentric plate cams all set at different radial distances from the pump shaft and extending for 180 degrees of their circumference in one direction and for the other 180 degrees thereof in an opposite direction and co-acting with studs set at similarly different distances from the pump shaft to reciprocate a piston as a result of the rotation thereof fully in both directions in combination with a suitable pump casing with inlet and outlet ports, valves and connections, a cylinder, a piston, a shaft and means for rotating the said shaft substantially as described.

4. In a pump of the character described the combination of cam mechanisms on opposite sides of a rotating piston, comprising two sets of a plurality of plate cams set at different radial distances from the pump shaft and of a plurality of stud cams set at correspondingly different distances from the pump shaft on the opposite sides of the piston and the inner pump surfaces facing the same and co-acting together to reciprocate the piston fully in both directions by the rotation of the piston through one complete revolution, together with a suitable pump casing with inlet and outlet ports and valves, a piston, a shaft, a cylinder and means of rotating the piston in the cylinder while permitting it to be reciprocated by my said cam mechanism.

5. In a pump of the character described a pump mechanism for reciprocating a rotary piston composed of a double cam drive against two studs on the one surface of a piston at unequal distances from the pump shaft and on opposite sides of the pump shaft on the said one piston surface, with a similar double cam drive against similarly positioned studs on the opposite piston surface, said driving cams being embodied in inner pump surfaces opposite the said piston, and being set at unequal distances from the pump shaft corresponding to the cam studs on the said piston surfaces, together with a suitable pump casing, with inlet and outlet ports, valves and connections, a cylinder, a piston, a shaft and means for rotating the piston.

6. A piston in a rotary reciprocating pump, embodying a shaft projecting perpendicularly through the center of both flat surfaces thereof and adapted to extend beyond a pump casing on both sides to a distance corresponding to the amplitude of reciprocation of the piston therein, and also embodying on both of its flat surfaces a plurality of cam studs set at unequal radial distances from the shaft and projecting outwardly a distance corresponding to the amplitude of reciprocation of the piston, in combination with a suitable pump casing comprising plate cams inclining inwardly on both sides of the said piston and adapted to coact with the said plurality of studs on both sides thereof to reciprocate the piston fully in both directions by the rotation thereof through one revolution, inlet and outlet ports, valves and connections, a pump cylinder adapted to snugly inclose the said piston while allowing it to rotate and to be, by said cam mechanisms reciprocated therein, and means for rotating the said piston, substantially as described.

7. A pump cover embodying a shaft bearing and stuffing box and a plurality of plate cams cast integrally therewith and each positioned at different radial distances from the said shaft bearing, connective means for fastening one such cover on each side of a pump casing over opposite surfaces of a pump piston each surface embodying therefrom projecting studs for engagement with the said cams in the said cover and co-acting therewith to reciprocate the said piston by the rotation thereof, a pump casing containing a cylinder, inlet and outlet ports, valves and connections for water, a piston, a shaft and operative means substantially as described.

PATRICK J. ROONEY.

Witnesses:
ISAAC A. LEVY,
MARK J. KÄTZ.